(No Model.)

C. C. CHILD.
FRICTION CLUTCH.

No. 270,636. Patented Jan. 16, 1883.

WITNESSES
O. H. Chile
Chas. N. Farnham.

INVENTOR
Cyril C. Child

UNITED STATES PATENT OFFICE.

CYRIL C. CHILD, OF BOSTON, MASSACHUSETTS.

FRICTION-CLUTCH.

SPECIFICATION forming part of Letters Patent No. 270,636, dated January 16, 1883.

Application filed December 6, 1880. (No model.)

*To all whom it may concern:*

Be it known that I, CYRIL C. CHILD, of Boston, Massachusetts, have invented a new and useful Improvement in Friction-Clutches, of which the following is a specification.

My invention relates to improvements in clutches to attach a rotating pulley to a shaft, by means of which the shaft is caused to rotate with its combined mechanism, or the shaft may be revolving and by means of the clutch the pulley, with its combined mechanism, may be caused to revolve as desired.

In this invention the belt-pulley, which runs loosely on the shaft, is provided on one side with parallel ways or grooves attached to or forming a part of the spokes of the pulley. Moving in these ways or grooves are a pair of jaws, which are operated each by a lever fulcrumed on a bracket extending in toward the center from opposite sides of the pulley. The long arms of the levers are connected by links to a collar which slides on the shaft, and they all rotate with the pulley. The sliding of the collar by a shipper toward the pulley brings the links into a perpendicular position, and forces, by means of the levers, the jaws onto the shaft or a collar keyed to it, and rotates the shaft by means of the friction between the jaws and collar or shaft.

Figure 1:
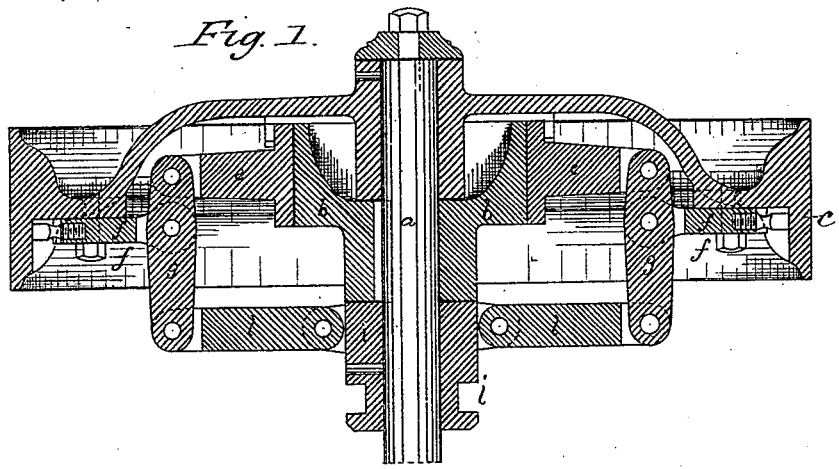
Figure 2:
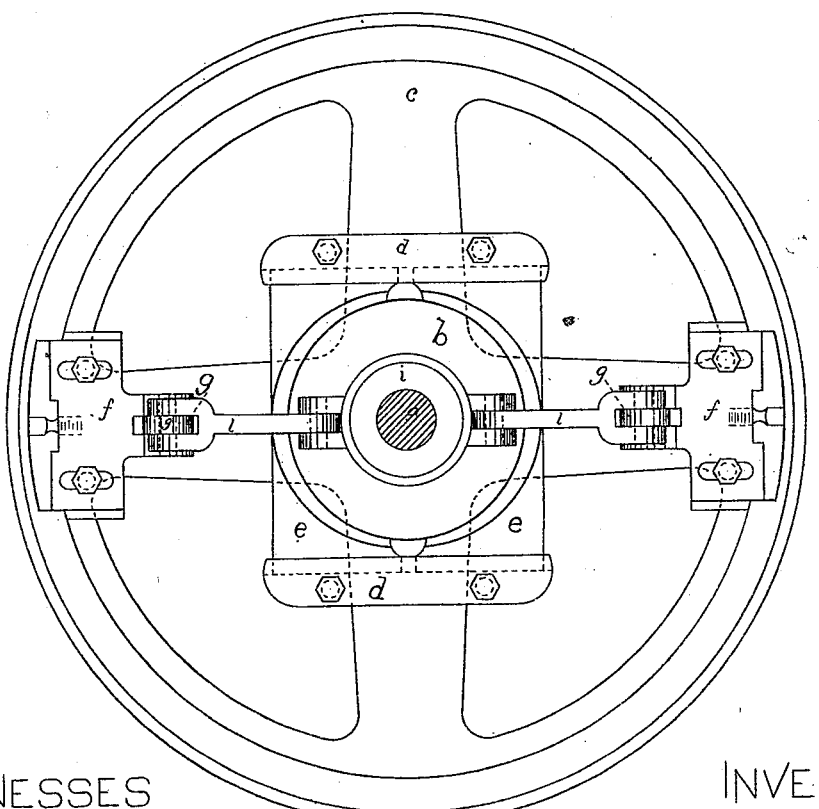

Figure 1 is a central vertical section, showing all the parts with the jaws forced onto the collar. Fig. 2 is an inside elevation of the clutch and pulley.

$a$ is the shaft on which my clutch is applied. $b$ is a collar keyed to the shaft. Running loosely on this shaft is a pulley, $c$, except when it is operated as hereinafter described. Attached rigidly to the side of the pulley are parallel ways $d$. These act to take the strain of starting the machine and to guide the jaws, which have a slight motion in and out, just enough to clear the collar.

Attached to the rim of the pulley $c$, on opposite sides and in the line of motion of the jaws, are two adjustable brackets, $f$. Fulcrumed on these brackets $f$ are two levers, $g$, each of which is connected to one of the jaws $e$. The other ends of the levers are by links $l$ connected to the sliding collar $i$. The sliding collar has a groove in it, by means of which, with a suitable shipper, it can be slid endwise a distance on the shaft. The sliding of the collar away from the pulley acts through links $l$ and levers $g$ to pull the jaws $e$ away from the collar $b$, the links $l$ then standing out of a perpendicular position, while sliding the loose collar toward the pulley moves the links $l$ back to a perpendicular position and forces the jaws with great pressure onto the collar $b$, thereby securing the pulley to the shaft, and thus imparting motion thereto. The brackets $f$ are adjustable on the rim of the pulley, so that any wear in the parts can be taken up.

The collar $b$ may be dispensed with; but I prefer to use it, both for presenting a larger surface for the jaws to clutch and to prevent any wear on the shaft. Each jaw may be made to extend around and press on nearly one-half of the collar or shaft. The jaws may be of any width and the collar of any size to suit the power required to be conveyed, and should be large and wide enough to prevent any undue wear of jaws or collar.

In some positions where I use this device I reverse it, allowing the shaft, with the collar keyed to it, to have the continuous rotation, and when the sliding collar is operated, and the jaws grasp the collar on the shaft, it starts the pulley or frame, which carries the ways and other parts of the clutch and other mechanism that is connected with the pulley or frame of ways.

What I claim as new, and desire to secure by Letters Patent of the United States, is—

1. The combination, in a friction-clutch mechanism, of a shaft, a pulley mounted loosely thereon, a pair of jaws mounted upon and revolving with said pulley and arranged to press inward upon and grip said shaft, or a collar or enlargement thereof, a pair of levers, also mounted upon and revolving with said pulley, and connected with said jaws, a sliding collar mounted upon said shaft and adapted to revolve with the pulley, and a pair of links each pivoted at one end to said sliding collar and at the other end to one of the jaw-operating levers, all arranged and adapted to operate substantially as described.

2. The combination of the shaft $a$, collar $b$, pulley $c$, jaws $e$ $e$, levers $g$ $g$, links $l$ $l$, and the sliding collar $i$, all constructed, arranged, and adapted to operate substantially as described.

3. The combination of the shaft $a$, the collar $b$, pulley $c$, provided with the slides $d\,d$, the jaws $e\,e$, levers $g\,g$, links $l\,l$, and the sliding collar $i$, all constructed, arranged, and adapted to operate substantially as and for the purpose specified.

4. The combination of the shaft $a$, the pulley $c$, the sliding collar $i$, links $l\,l$, levers $g\,g$, adjustable brackets $f\,f$, and jaws $e\,e$, all arranged and adapted to operate substantially as described.

5. The combination of the shaft $a$, collar $b$, pulley $c$, jaws $e\,e$, levers $g\,g$, adjustable brackets $f\,f$, links $l\,l$, and the sliding collar $i$, all arranged and adapted to operate substantially as described.

In testimony whereof I have signed my name to this specification in the presence of two subscribing witnesses.

CYRIL C. CHILD.

Witnesses:
E. A. HEMMENWAY,
WALTER E. LOMBARD.